United States Patent [19]

Luerken et al.

[11] 4,295,753

[45] Oct. 20, 1981

[54] TORQUE TRANSMITTING APPARATUS

[75] Inventors: Adolf Luerken, Palos Verdes; William D. Vogel, Arcadia, both of Calif.

[73] Assignee: McCulloch Corporation, Los Angeles, Calif.

[21] Appl. No.: 850,137

[22] Filed: Nov. 10, 1977

[51] Int. Cl.³ .............................................. F16D 1/08
[52] U.S. Cl. .................................... 403/365; 74/447; 403/259
[58] Field of Search ............... 403/359, 370, 356, 259, 403/368, 365, 193, 194, 197; 74/447; 151/41.74

[56] References Cited

U.S. PATENT DOCUMENTS

| 281,618 | 7/1883 | Crowell | 403/359 X |
| 2,084,777 | 6/1937 | Poggensee | 403/365 X |
| 2,164,744 | 7/1939 | Huth | 403/197 X |
| 2,761,713 | 9/1956 | Schultze | 403/359 X |
| 3,069,918 | 12/1962 | Schultz | 403/359 X |
| 4,006,993 | 2/1977 | Woerlee | 403/359 |

FOREIGN PATENT DOCUMENTS

| 1112673 | 8/1961 | Fed. Rep. of Germany | 403/359 |
| 2159264 | 6/1973 | Fed. Rep. of Germany | 403/359 |
| 965381 | 9/1950 | France | 403/359 |
| 263871 | 9/1927 | United Kingdom | 403/356 |

Primary Examiner—Rodney H. Bonck
Attorney, Agent, or Firm—Kenway & Jenney

[57] ABSTRACT

Apparatus for mounting a rotatable component on a rotating shaft using a non-machined torque transmitting intermediate hub member is disclosed. The hub member makes torque transmitting contact with the drive shaft and transmits that torque to the rotatable component through frictional contact at a taper on the drive shaft and at a recessed shoulder of the hub as well as by an external key on the hub periphery and a matching cut-out formed in the rotatable member. There is also a keyway and key between the drive shaft and hub for accurate alignment in assembly and disassembly. A plurality of narrow longitudinally extending rib members are integral with and are supported on the other peripheral surface of the hub member whereby the rotatable member when it is seated against the shoulder on the hub member for the first time mechanically distorts the rib members from their original shape to provide a secure but releasable fit between the hub member and the rotatable component. A nut and washer assembly secure the rotatable component and hub member to the drive shaft.

12 Claims, 3 Drawing Figures

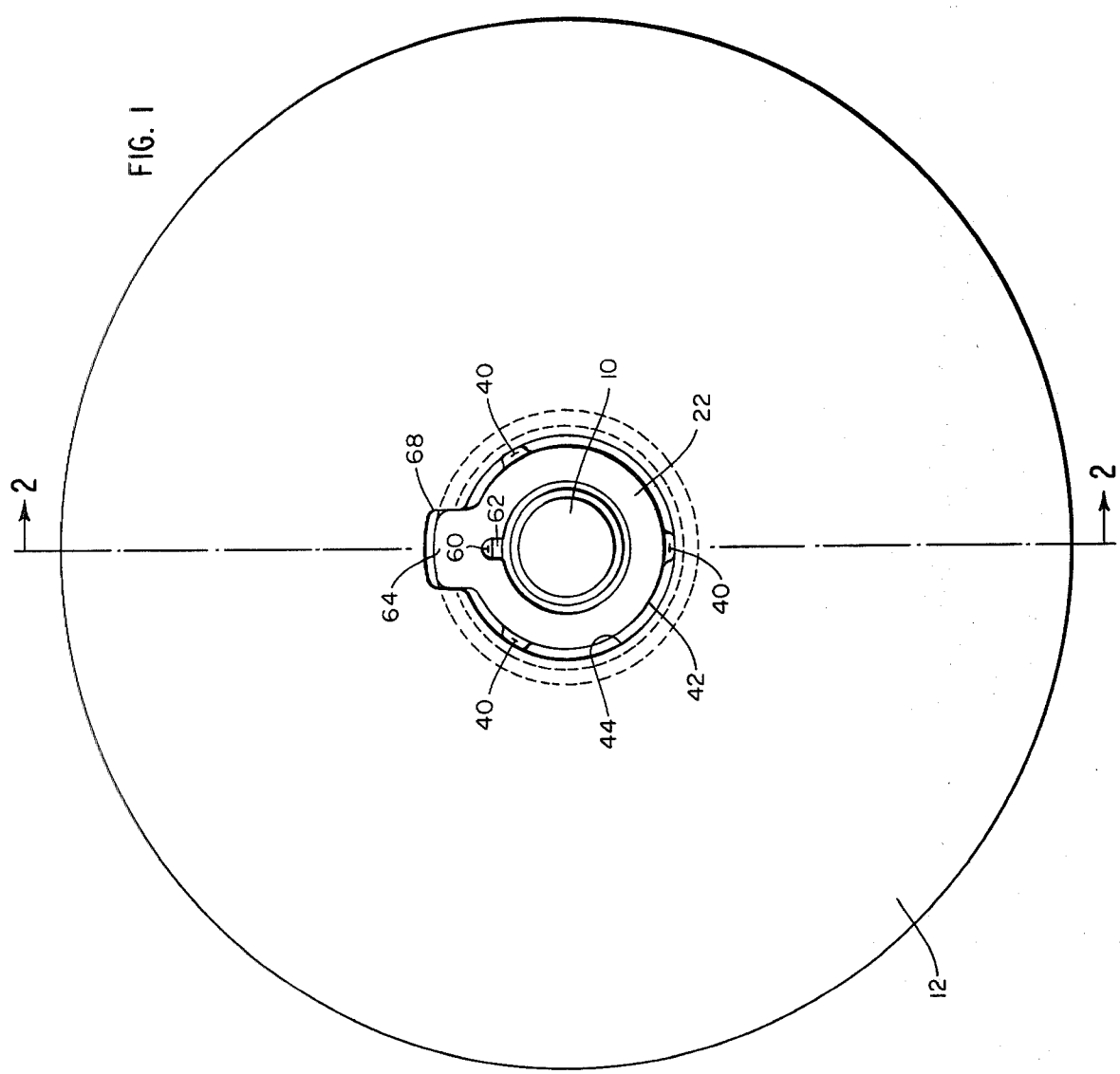

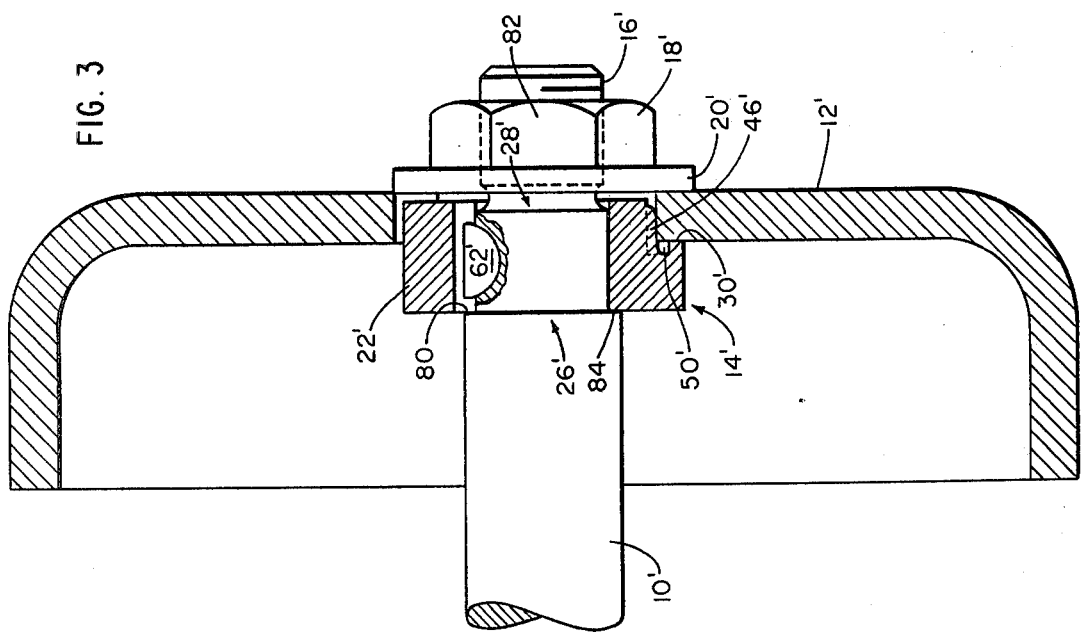

TORQUE TRANSMITTING APPARATUS

The invention relates generally to a mechanical drive system for transmitting torque from a rotating drive shaft to a rotatable member, and in particular, to the hub member of a mechanical drive system for mounting the rotatable member on the rotating drive shaft.

BACKGROUND OF THE INVENTION

Mechanical systems in which torque is transmitted from a drive shaft, for example a tapered crankshaft having a relatively high angular speed of rotation, to a rotatable component, such as a stamped flywheel, usually require a hub connection which is permanently attached to the rotatable component. The hub must be machined after assembly to guarantee accurate concentricity and perpendicularity; however, the requirement of accurate machining significantly increases the manufacturing cost of the assembly.

A typical application of this kind of assembly is to mount a flywheel on the crankshaft of an internal combustion engine, for example, for providing air cooling for an engine or for mounting the engine magneto or ignition system. In this application, price may be very important and therefore any manufacturing cost reduction can be significant.

It is therefore a principal object of this invention to provide an apparatus for mounting a rotatable component on a rotating drive shaft using inexpensive manufacturing techniques in which close dimensional tolerances need not be maintained. Other objects of the invention are to provide an apparatus which is simple to manufacture, which may be produced by mass production techniques, which need not be machined, which is reliable, which has a low manufacturing cost, and which will withstand the loads encountered in both light and heavy duty applications.

SUMMARY OF THE INVENTION

The invention relates to apparatus for mounting a rotatable component on a rotating drive shaft. The invention features an intermediate torque transmitting hub member having an internal bore, a torque receiving surface, a torque transmitting surface, and a plurality of longitudinally extending rib members spaced apart and supported by an outside peripheral surface of the intermediate member. Thereby, the drive shaft engages the intermediate member and makes frictional contact with the torque receiving surface, the intermediate member engages the rotatable component along the torque transmitting surface, and the rotatable component, when seated against the torque transmitting surface for the first time, mechanically distorts the original shape of the rib members whereby the assembly can be secured to provide a reliable and aligned torque drive system.

In a preferred embodiment of the invention, the intermediate torque transmitting hub member has a tapered internal bore extending in a longitudinal direction from a shaft receiving aperture at a first surface of the member to a narrowed exit aperture at a second surface of the member. The hub member further features a recessed shoulder extending around a peripheral surface of the member for seating the rotatable component, the shoulder being substantially concentric with the longitudinal axis of the bore. As noted above, a plurality of longitudinally extending narrow rib members are supported by an outside peripheral surface of the member. Thereby, a tapered drive shaft passes through the intermediate member, the internal taper of the intermediate member matching the taper of the drive shaft, and the rotatable component, when seated against the recessed shoulder for the first time, mechanically distorts the original shape of the rib members. In a particularly preferred embodiment, the rotatable component is a stamped flywheel, the intermediate hub member is not machined, and the drive shaft is the crankshaft of an internal combustion engine such as that used on motorized bicycles.

In another aspect of the invention, the apparatus features a shoulder cutout around an inner periphery of the shoulder whereby the rotatable component, when it is seated, contacts only an outside annulus of the original shoulder surface. The apparatus further features a keyway formed in the bore of the intermediate member for engaging a key in the drive shaft, and a protrusion on an outside periphery of the hub member for engaging a corresponding cutout in the rotatable component. Thereby, a selected relative angular position of the shaft and the rotatable component can be maintained.

The intermediate hub member is assembled with the drive shaft and the rotatable component by passing the drive shaft through the hub member bore, that is, first through the shaft receiving aperture and then through the narrowed exit aperture. The rotatable component is then seated on the hub member, collapsing or deforming at least some portion of the rib members, and a washer and threaded nut, the washer having an outer diameter greater than the diameter of a central aperture of the rotating component, secure the assembly. The nut and washer combination is threaded onto an externally threaded end of the drive shaft. Thereby, when the nut is tightened, the drive shaft is pulled into more intimate contact with the intermediate hub member and the intermediate hub member is urged into a greater frictional driving contact, at the shoulder, with the rotatable component. Other means for securing the assembly can also be used. It will be understood that the rib members of a harder material than the rotatable component may deform the material of the rotatable component upon assembly.

DESCRIPTION OF THE DRAWINGS

Other objects, features, and advantages of the invention will appear from the following description of particular preferred embodiments taken together with the drawings in which:

FIG. 1 is an end view of the rotatable component mounted on a drive shaft according to the invention with the securing nut and washer omitted for clarity;

FIG. 2 is a cross-sectional view along lines 2—2 of FIG. 1 with the nut and washer shown in place; and FIG. 3 is a cross-sectional view of an alternative embodiment of the invention.

DESCRIPTION OF A PREFERRED EMBODIMENT

Referring to FIGS. 1 and 2, a rotating drive shaft 10 is coupled to a rotatable component 12, for example, a flywheel used to mount an air cooling device or an ignition system for an internal combustion engine, by a non-machined intermediate torque transmitting assembly 14 mounted on drive shaft 10. The assembly 14 and rotatable component 12 are secured to a threaded end 16 of rotating drive shaft 10, by a securing assembly comprising a nut 18 and washer 20. The intermediate torque transmitting assembly according to the invention, comprises an intermediate hub member 22 which has a first torque receiving surface 24 which in the illustrated embodiment is an interior surface of a tapered bore extending from a shaft receiving aperture 26 to a narrowed shaft exit aperture 28. The taper is designed to match the taper which has previously been machined onto rotating drive shaft 10. Intermediate hub member 22 further has a torque transmitting surface 30 here shown as a recessed shoulder extending around the periphery of hub member 22 and on which the rotatable component 12 seats.

As noted above, the assembly is secured by tightening internally threaded nut 18 onto washer 20. The diameter of the outer circumference of washer 20 is greater than the diameter of aperture 44 in the rotatable component 12. Thus, by tightening nut 18, rotating drive shaft 10 urges assembly 14 in a longitudinal direction so that the torque transmitting surface 30 strongly engages rotatable component 12 and at the same time, torque receiving surface 24 is strongly engaged by the tapered surface of drive shaft 10. Thereafter, when drive shaft 10 rotates, torque is transmitted from the drive shaft to the intermediate member through the torque receiving surface (the internal surface 24 of the tapered bore of intermediate hub member 22) and the intermediate member 22 in turn transmits the applied torque to rotatable component 12 through torque transmitting surface 30 acting upon the surface 36 of the component 12.

The intermediate hub member 22 is further provided with the plurality of narrow, longitudinally extending, rib members 40, spaced around and integral with an outside peripheral surface 42 of intermediate hub member 22. The rib members have a radially outwardly directed height which is limited to just overcome the maximum allowable manufacturing clearance between the hub 22 and the rotatable component 12, that is, a height greater than the maximum opening between the hub peripheral surface 42 and the inside surface 44 of rotatable component aperture 34. The ribs are preferably slightly pointed at their front ends 46, closest, in the illustrated embodiment, to the narrowed aperture 28. This pointed structure provides an easy start as the rotatable component is first placed in contact with hub member 22. Thus, the ribs will distort or deform as the rotatable component engages the hub member for the first time.

By providing ribs 40, there is advantageously eliminated the requirement that the rotatable component and the hub member be machined precisely in order to provide a good fit and alignment. This significantly reduces the cost of the assembly because, for example, the rotatable component 12 may be a stamped component and the hub member can be produced, for example, as sintered metal or by investment casting or cold forging. Machining the hub member to obtain closer tolerances is not required.

In the illustrated embodiment, the hub member 22 is further provided with a cutout recess 50 in the recessed shoulder 30 so that the hub contacts the rotatable component 12 only at an outer annular portion. This provides for better "squareness" and improved torque transmission. Also this cutout provides space for any metal from the ribs or rotatable component which is deformed and displaced in this direction during assembly.

In those circumstances where a specific position or alignment of the rotatable component relative to the rotating shaft is required or desired, a recessed keyway 60 is formed in the taper of the hub member 22 and engages a key 62 in the rotating drive shaft. In addition, a protrusion 64 extends radially outward from peripheral surface 42 of the hub member 22 as a structural reinforcement for the keyway formed in the taper of the hub member and to align with a corresponding cutout 68 in the rotatable component. This provides a selected aligned orientation between the rotatable component 12 and the drive shaft 10. Thus, the key and keyway, in combination with the protrusion and cutout, serve as a guide to ensure that the hub and flywheel will always be reassembled in their original assembly position should they ever be separated during disassembly. This also assures that alignment between the hub member 22 and rotatable component 12 is maintained; whereby upon reassembly of the apparatus, the deformed ribs will always line up with the same portion of the rotatable member.

Advantageously, the front end 70 of the hub member is recessed slightly in its assembled position with rotatable component 12 so that washer 20 does not engage a hub surface 70 even after proper tightening. A solid, vibration free assembly is thereby assured.

Referring to FIG. 3, in other applications of the invention, such as those for use with light loads, the hub may be mounted against an annular shoulder 80 of the drive shaft rather than against a shaft taper. In FIG. 3, the reference numerals of FIGS. 1 and 2 are applied to identify the same parts, however a prime has been added in FIG. 3 to make the description easier to follow. Referring to FIG. 3, the drive shaft 10' has a reduced diameter at its end 82 thereby forming the shoulder 80. Hub member 22' has a cylindrical bore and engages shoulder 80 at its surface 84. In other respects, the drive shaft, the rotatable component 12', and the hub member of FIG. 3, are substantially the same as the corresponding components of FIGS. 1 and 2.

In a particular application of the invention, the drive shaft is the power output crankshaft of an internal combustion engine, such as those used to drive a motorized vehicle, for example, a bicycle or Moped. The rotatable component 12 is typically a flywheel having secured thereon a centrifugal air pump which provides the required air flow for cooling the engine. A typical example of an air cooled engine is described in Hackbarth et al, U.S. Pat. No. 3,893,817, issued July 8, 1975. The invention may of course be used in any other application wherein a rotatable component is permanently mounted on a rotating drive shaft.

ADVANTAGES OF THE INVENTION

The invention thus advantageously provides an assembly in which a non-machined hub transmits torque from a rotating drive shaft to a rotatable component. The cost of the assembly is significantly reduced, compared to prior structures, because the hub member, according to the invention, no longer needs to be machined to precise tolerances to guarantee concentricity and perpendicularity of the assembly. The significant cost advantage, by eliminating the machining process and as a result, by using less expensive component manufacturing processes, provides significant advantages unavailable in the prior art.

In addition, the invention advantageously provides a simple, reliable, and releasable hub member so that disassembly is simple and reassembly is convenient.

Selected relative angular orientations may also be maintained.

Other embodiments of the invention, including additions, subtractions, deletions, and other modifications of the disclosed preferred embodiments, will be obvious to those skilled in the art and are within the scope of the following claims.

What is claimed is:

1. Apparatus for mounting a rotatable component on a tapered rotating drive shaft comprising
   an intermediate torque transmitting hub member having
      a tapered internal bore extending in a longitudinal directional from a shaft receiving aperture at a first surface of said member to a narrowed exit aperture at a second surface of said member,
      a recessed shoulder extending around a peripheral surface of the member, for seating said rotatable component, said shoulder being substantially concentric with the longitudinal axis of said bore,
      a shoulder cutout around an inner periphery of said shoulder,
      a plurality of narrow, longitudinally extending rib members spaced-apart on and supported by an outside peripheral surface of said member,
   whereby said tapered drive shaft passes through said intermediate member, the internal taper of the intermediate member matches the taper of the drive shaft, said rotatable component, when it is seated, contacts said shoulder only at an outside annulus of said shoulder, and the rotatable component, when seated against said recessed shoulder for the first time, mechanically distorts the original shape of said rib members, and
   drive torque is transferred from said drive shaft to said intermediate member through the interior surface of the member tapered bore, and from the member shoulder, through friction contact, to the rotatable component.

2. The apparatus of claim 1 further including a keyway formed in the tapered bore of the intermediate member for engaing a key in the drive shaft, and
   a protrusion extending from an outside peripheral surface of said member for engaging a corresponding cutout of said rotatable component,
   whereby a selected relative angular alignment between the drive shaft and the rotatable component can be maintained.

3. The apparatus of claim 2 wherein said protrusion is positioned radially outward from said keyway for providing structural reinforcement for said member.

4. The apparatus of claim 1 further comprising a washer having an outside diameter greater than the diameter of the hub receiving aperture of said rotatable component, and
   an internally threaded member for engaging corresponding threads on said drive shaft for urging said washer against said rotatable component and for pulling said drive shaft into intimate contact with the internal bore of said intermediate member and thereby pulling the intermediate member into frictional driving contact, at said shoulder, with the rotatable component.

5. The apparatus of claim 1 wherein said intermediate hub member is a non-machined single piece assembly.

6. Apparatus for mounting a rotatable flywheel on a tapered crankshaft of an internal combustion engine comprising
   an intermediate torque transmitting hub member having
      a tapered internal bore extending in a longitudinal direction from a crankshaft receiving aperture at a first surface of said member to a narrowed exit aperture at a second surface of said member,
      a recessed shoulder extending around a periphery of the intermediate member for receiving the flywheel, said shoulder being substantially concentric with the longitudinal axis of the bore,
      an undercut section around an inner periphery of the shoulder, and
      a plurality of narrow, longitudinally extending rib members supported by and integral with an outside peripheral surface of the hub member,
   whereby the tapered crankshaft passes through the hub member, the internal taper of the intermediate hub member matches the taper of the crankshaft, the flywheel contacts said recessed shoulder of the hub member only at an outer annulus of the shoulder, and the rotatable flywheel, when seated against said recessed shoulder for the first time, mechanically deforms the original shape of the rib members, and
   drive torque is transferred from the crankshaft to the hub member through the tapered bore and is transferred from the intermediate hub member to the flywheel through frictional contact between the recessed shoulder and the flywheel.

7. The apparatus of claim 6 wherein each rib member is pointed at an end closest to the narrowed exit aperture.

8. Apparatus for mounting a rotatable component on a rotating drive shaft having an annular recessed shoulder comprising
   an intermediate torque transmitting hub member having
      a cylindrical internal bore extending in a longitudinal direction from a shaft receiving aperture at a first surface of the member to a shaft exit aperture at a second surface of the member,
      a hub recessed shoulder extending around an outer periphery of the member for receiving said rotatable component, said hub shoulder being substantially concentric with the longitudinal axis of the bore,
      a shoulder cutout around an inner periphery of said hub shoulder, and
      a plurality of narrow, longitudinally extending, rib members spaced around and supported by an outer peripheral surface of said hub member,
   whereby said shouldered drive shaft passes through the intermediate member bore, the first surface of said intermediate member rests on said annular recessed shoulder, said rotatable member, when it is seated, contacts said member shoulder only at an outside diameter of said member shoulder, and the rotatable component, when seated against the hub recessed shoulder for the first time, mechanically distorts the original shape of the rib members, and
   drive torque is transferred from the drive shaft to said intermediate member through the frictional contact of the annular recessed shoulder with the first surface of the intermediate hub member, and from the hub member to the rotatable component through frictional contact of the hub recessed shoulder and the rotatable component.

9. The apparatus of claim 8 wherein said hub member is a non-machined single piece assembly.

10. Apparatus for mounting a rotatable component on a rotating drive shaft comprising
an intermediate torque transmitting hub member having
an internal bore,
a torque receiving surface,
a primary torque transmitting surface, and
a cutout section around an inner periphery of said torque transmitting surface,
a plurality of longitudinally directed rib members spaced along and integral with an outside peripheral surface of said intermediate member,
whereby the drive shaft engages the intermediate member at said torque receiving surface, said intermediate member engages the rotatable component along said torque transmitting surface, said rotatable component, when it is seated, contacts said torque transmitting surface only at an outer periphery of said torque transmitting surface, and said rotatable component, when seated against said torque transmitting surface for the first time, mechanically distorts the original shape of said rib members, and
means for securing said rotatable component and said hub member to said drive shaft to provide a torque drive system.

11. The apparatus of claim 10 wherein said rotatable component is a stamped component and said intermediate hub member is a non-machined, single piece assembly.

12. The apparatus of claim 10 wherein these are at least three rib members.

* * * * *